United States Patent
Zhang et al.

(10) Patent No.: US 8,349,176 B2
(45) Date of Patent: Jan. 8, 2013

(54) MODULAR INTEGRATED WATER-PURIFYING DEVICE

(75) Inventors: Yalei Zhang, Shanghai (CN); Zhiping Kuang, Shanghai (CN); Yisun Chen, Shanghai (CN); Yongkuan Huang, Shanghai (CN); Gu Chen, Shanghai (CN); Xuefei Zhou, Shanghai (CN); Wei Huang, Shanghai (CN); Zheng Shen, Shanghai (CN)

(73) Assignee: Tongji University, Shanghai (CN)

( * ) Notice: Subject to any disclaimer, the term of this patent is extended or adjusted under 35 U.S.C. 154(b) by 337 days.

(21) Appl. No.: 12/748,887

(22) Filed: Mar. 29, 2010

(65) Prior Publication Data
US 2011/0155655 A1    Jun. 30, 2011

(30) Foreign Application Priority Data

Dec. 24, 2009  (CN) .......................... 2009 1 0200627

(51) Int. Cl.
*B01D 35/00* (2006.01)
(52) U.S. Cl. ...................... 210/205; 210/257.1; 210/298; 210/305; 210/320; 210/527; 210/532.2

(58) Field of Classification Search .................. 210/199, 210/205, 207, 208, 252, 257.1, 298, 305, 210/320, 521, 522, 525, 527, 532.1, 532.2
See application file for complete search history.

(56) References Cited

U.S. PATENT DOCUMENTS

| | | | | |
|---|---|---|---|---|
| 349,990 A | * | 9/1886 | Gaillet et al. | 210/521 |
| 3,779,910 A | * | 12/1973 | Chatfield | 210/208 |
| 4,199,451 A | * | 4/1980 | Hsiung et al. | 210/521 |

* cited by examiner

*Primary Examiner* — Lucas Stelling
(74) *Attorney, Agent, or Firm* — Lowe Hauptman Ham & Berner LLP

(57) ABSTRACT

In a kind of modular integrated water purifying device, including reaction tank, sedimentation tank and filter pool, a pump is connected to the top side of the reaction tank through pipes and valves. There are variable grid hole mixing paddles in the reaction tank, forced outlet pipe at the bottom of sedimentation tank and the same-flow ramp board in the middle. The sedimentation water collector is set up below the board, with the purified water outlet tube connected. The traveling sludge sucker sits on the top of filter tank and move back and forth. Blanket-shape filters is vertically fixed in the filteration tank, the mud-suction pump below to the raveling mud-suction machine connects to the mud-suction pipe another side to the blanket-like wedge filters. At the bottom of the filteration tanker lie the water-collecting main pipe and clean water outlet, the effluent weir is fixed inside of the filteration tank.

6 Claims, 6 Drawing Sheets

(a)

(b)

MODULAR INTEGRATED WATER-PURIFYING DEVICE

RELATED APPLICATIONS

The present application is based on, and claims priority from Chinese Application Number 200910200627.0, filed Dec. 24, 2009, the disclosure of which is hereby incorporated by reference herein in its entirety.

FIELD OF THE INVENTION

This invention belongs to the field of water treatment technology, specifically related to a kind of the modular integrated water-purifying device.

BACKGROUND OF THE INVENTION

Although large urban water plant ensures the good quality of life for urban and rural areas and provides production water supply through the dense spider web of underground pipes, many problems exist in its huge water distribution system: (1) long-distance and large-diameter pipes incurs very high investment; (2) The pipeline head loss is huge, resulting in high energy consumption in pumping station as well as increasing daily operating costs; (3) The problems such as pipelines leakage, burst pipes, water supply break and etc. lead to many potential safety hazard and high maintenance workload; (4) Secondary pollution is severe in the pipe and it's hard to guarantee the water quality and meanwhile incurring the increasing disinfectant dosage.

Therefore, it is become a key issue for the water industry' that how to solve the above problems in order to provide reliable drinking water for the areas with ample water resource and without building vast water pipe network system.

SUMMARY OF THE INVENTION

The aim of the invention is to provide a modular integrated water-purifying device.

The water-purifying device of the invention presented the following some significant advantages: 1) compact structure without netting pipe among each unit; 2) covering a small area, shallow tanks and low costing; 3) short producing period, low dose consuming and easy to manage; 4) the effluent quality meeting the national drinking water quality standards.

Figure 1:
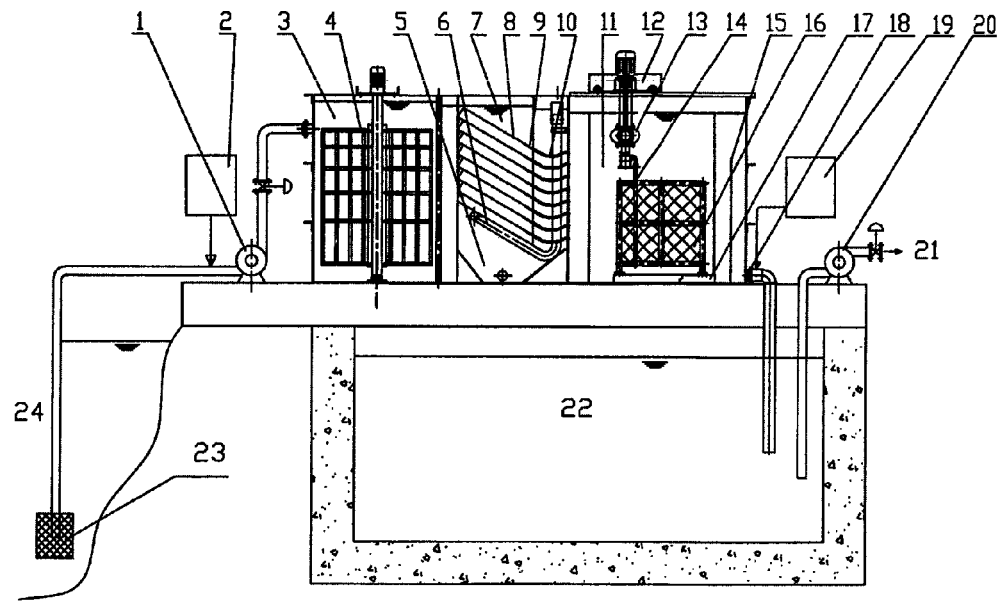
FIG. 1: shows the process diagram of implementation case of the invention.

The signal in the FIG. 1 is the inlet pump, 2 is the coagulant-dosing equipment 3 is the reaction tank, 4 is the variable grid impeller, 5 is the mud bucket, 6 is the forced water-collecting pipe, 7 is the sedimentation tank, 8 is the same-flow oblique boards, 9 is the sedimentation water collector, 10 is the purified water outlet tube, 11 is the filtration tank, 12 is the traveling mud-suction machine, 13 is the mud-suction pump, 14 is the mud-suction pipe, 15 is the effluent weir, 16 is the blanket-like wedge filters, 17 is the water-collecting main pipe, 18 is the purified water outlet, 19 is the disinfectant-dosing equipment, 20 is the elevated pump of the clean water, 21 is drinking water, 22 is the clean water tank, 23 is water intake, 24 is river, 25 is frequency-changing motor, 26 is reaction area, 27 is distribution area for well water, 28 is the clear waxer outlet, 29 is the forced water outlet, 30 is water inlet, 31 is the forced water outlet pipe, 32 is the mud-discharging pipe, 33 is the division plate, 34 is mud-suction main pipe, 35 is the driving motor, 36 is the gross mud-suction piper, 37 is mud-discharge pipe, 38 is the filter frame, 39 is the direction of filtration, 40 is the sand filter layer, 41 is the cobble support layer, 42 is the effluent pipe, 43 is the influent distribution zone, 44 is the oblique boards, 45 is the clear water pipe, 46 is the water-collecting basin, 47 is the mud-dripping zone, 48 is the mud hopper, 49 is the flat agitator blade.

DETAILED DESCRIPTION

This invention provides a modular integrated water-purifying device, including the reaction tank 3, sedimentation tank 7 and filtration tank 11, wherein:

The inlet pump 1 is connected to the upper side of the reaction tank 3 through a pipe and a valve, and the variable grid impeller 4 is equipped within the reaction tank 3;

The same-flow oblique boards 8 is sit in the middle of sedimentation tank 7, and is connected by a forced water-collecting pipe 6 to the water collector 9 below. Purified water is discharged from the purified water outlet tube 10, and another end of purified water outlet tube 10 is connected to the end of the sedimentation water collector 9.

The traveling mud-suction machine 12 is equipped at the top of the filter tank 11 which can move back and forth at the top of the filter tank 11. The blanket-like wedge filters 16 are fixed vertically inside the filter tank 11. The mud-suction pump 13 is fixed in the bottom of the traveling mud-suction machine 12. The one side of mud-suction pipe 14 is connected to the mud-suction pump 13, and the other side of mud-suction pipe 14 is linked to the blanket-like wedge filters 16. The water-collecting main pipe 17 lies at the bottom of the filter tank 11. The effluent weir 15 is fixed vertically within the filter tank 11. Purified water outlet 18 lies at the bottom of the side of the filter bank 11.

In this invention, the other end of the outlet tube 10 is inserted in the hole of the division plate 33.

In this invention, the pipes connecting to the purified water outlet 18 is equipped with a disinfectant-dosing equipment 19.

In this invention, the water-suction tube equipped with coagulant-dosing equipment 2 is connected to the other end of the inlet pump 1."

In this invention, the other end of the pipe connecting to the purified water outlet 18 is inserted into the clean water tank 22.

In this invention, the variable grid impeller 4 is connected to frequency-changing motor 25.

In this invention, the forced water-collecting pipe 6 is connected with the forced water outlet pipe 31 to the forced water outlet 29, which is sit at the top of the sedimentation tank 7.

In this invention, the blanket-like wedge filters 16 are fixed in the filter frame 38 in the form of plug-in structure, and the filter frame 38 lies inside the filter tank 11. The traveling mud-suction machine 12 is connected to driving motor 35. The mud-suction pump 13 is connected by the mud-suction main piper 34 to the mud-suction pipe 14. The mud-suction pump 13 is connected by the gross mud-suction piper 36 to the mud-discharge pipe 37.

The improvement and innovativeness points of the invention are as follows:

1. Coagulation Process

1). Injecting coagulant into the water-suction pipe of the inlet pump and enhancing the mixing by high-speed rotation of the pump impeller can reduce the dosage of pharmaceutical; 2). The tangential water inleting together with tangential spurring promoted by the pump helps lessen power consumption of the mixer, 3). Using a variable grid impeller and the frequency-changing motor ensures the best work state; 4). Employing the variable grid impeller (see FIG. 3) instead of the traditional plate-type impeller (see FIG. 2), leading to following three advantages:
A) Better distribution of water flow and Larger interface of water and impeller; B) Water flowing through a number of the meshes, results in a series of changes in flow velocity and in direction, benefiting greatly the collision and cohesion for the flocculating granulars; C) The mesh sizes gradually become larger along the water depth direction and the flow rate becomes smaller and smaller, which is consistent with the laws of velocity gradient and floc growth.

The above series of improvements in the invention can shortens the coagulation reaction time to less than 15 minutes from more than 20 minutes in traditional reaction.

2. Precipitation Process

Among the various sedimentation technologies, the oblique board (tube) sedimentation can achieve the highest settling efficiency, of which the same-flow gets the better settling results compared to the other forms. This invention adopts a same-flow oblique boards (see FIG. 4), revealing the benefits as follows: A) Not colliding of the flocculating granulars and the water results in the much faster separation of mud and water, B) The small dip angle brings on the larger settling area of sedimentation; C) The higher surface load and the quicker water production; meanwhile, It is also has drawbacks very clear A) The oblique boards as long as three meters or so which consumes too much material; B) the oblique-boards water-collector with a mud sliding ramp which adds difficulties and costs of manufacture; D) The clean water-collecting pipes still having to set up along the oblique boards and extending to the top of the water collector, which brings difficulties in both processing and installation.

The principal innovation of the invention is as follows:

(1) Omitting the water-inlet distribution area which has occupied large part of total water volume. In conventional oblique board (tube) settling design, regardless of the form of the same-flow or reverse flow, a water-inlet distribution area is needed in order to distribute evenly the settling water. So, the traditional water-inlet distribution area in height is about 1.0 m, this invention increasing the total pond height (see FIG. 5).

In this invention, however, the water after the reaction tank directly comes into the sedimentation tank (see FIG. 6), which greatly reduces the height of the sedimentation tank.

(2) Using straight board instead of mud sliding ramp not only saves the material of oblique boards, but also greatly simplifies the processing and installation.

(3) Installing of the adjustable forced water outlet pipe (see FIG. 7) can solve the velocity to zero between oblique boards when collecting water and the difficulties for sludge sliding.

(4) The water-collecting system, as the key part for the effect of water purifying, has been improved significantly (see FIG. 8); as following A) A special water collector is designed to collect the clear water of a few millimeters between the collecting boards; B) The clear water-collecting pipe directly connected with the transition area for subsequent treatment, rather than reaching the pool roof along with oblique boards, which makes the device more compact and uses the fewer materials.

3. Filtration Process

For thousands of years, drinking water filtration technology has been constrained mainly by two major bottlenecks: ① The dominant filter materials still is quartz sand, anthracite or other dispersed particulates, which makes the filter tank heavy and bulky; ② The huge anti-flushing system needs a complicated washing equipment (including storage tanks, pumps, flushing pipes, valves, drainage channels, etc.). To solve the above drawbacks, this invention device is mainly innovated upon to set up a simple and efficient filtration process as following:

(1) The shortcomings of conventional filter material such as quartz sand, anthracite or other dispersed particulates are the large depth of filter layer and support layer (usually more than 110 cm); filter tank per square meter requires one ton or more filter materials; the screening for effective diameter particulates is troublesome because of selecting out of a large number of substrates; it is difficult to flip, clean and transport the conventional filter material after the failure. The filtering layer thickness in this invention device is only about 2.0 cm by using blanket-like fiber as a filter material rather than using conventional quartz sand, anthracite or other dispersed particles; the weight per square meter is only 2-3 kg for the light fiber filter material; other advantages for the device includes strong strength, non-toxic, and corrosion resistant and low price. More over, the density and thickness of the fiber filter material can be selected according to different requirements for effluent water quality.

(2) This invention device adopts top-down filtration flow direction, expanding the filtration area greatly. The filter area for the conventional filter tank is determined by the surface area of the filter, that is, how much of its surface area, how much of its filter area (see FIG. 9); while the filtration area of this invention device enlarges at least eight times (see FIG. 10) more than that the conventional filter tank by utilizing the extra space of the latter including the filter layer; the supporting layer and the water-collecting system.

(3) This invention device use mud-suction pump to achieve the backwashing of the filter tank (see FIG. 11), thereby eliminating the needs of the various backwash facilities for conventional filter tank (such as water storage towers for flushing, washing pump, washing pipe, etc.). A thin slit mud-suction pipe closes to the surface of carpet-like filter by the suction pipe. With the help of force of mud-suction pump, the mud is divorced from the blanket-like wedge filters and then discharged out. With the moving back and forth of the traveling mud-suction machine, the mud on the surface of every filter will be cleaned up.

(4) The backwash of this invention device is only a uniform velocity process of linear sweeping wash, which leading a very small backwash water consumption and even inhaling wash. Meanwhile, there's no need to pause influent or keep separate washing water, thus effluent should not be completely stopped.

(5) The plug-in structure between the blanket-like wedge filter and fixed frame makes reparation or replacement of filter pieces very convenient. Operators will avoid suffering of the carrying and flipping filter material in the process of routine repairs and maintenance for the filter.

EXAMPLES

The present invention can be explained in detail by the following examples, but not limited to these.

Example 1

As shown in FIG. 1, the invention device including the following parts, i.e. the inlet pump 1, the coagulant-dosing equipment 2, the reaction tank 3, the variable grid impeller 4, the mud bucket 5, the forced water-collecting pipe 6, the sedimentation tank 7, the same-flow oblique boards 8, the sedimentation water collector 9, the purified water outlet tube 10, the filtration tank 11, the traveling mud-suction machine 12, the mud-suction pump 13, the mud-suction pipe 14, the effluent weir 15, the blanket-like wedge filters 16, the water-collecting main pipe 17, the purified water outlet 18, the disinfectant-dosing equipment 19, the elevated pump of the clean water 20, drinking water 21, the clean water tank 22, the water intake 23 and river 24.

Coagulation process mainly react in the reaction tank 3. During upgrading by the inlet pump 1, the raw water mixes fully with the coagulants by high-speed rotation of the pump impeller, and then flows into the sedimentation tank 7. Due to working of the sedimentation tank 7, the most of sludge comes into the sludge bucket 5 sitting at the bottom of the sedimentation tank 7. At the same time, the water after passing sedimentation tank 7, flows into the water collector 9 via the same-flow oblique boards 8, and then the clear water intercepted by the blanket-like wedge filters 16, flows out of the device by gravity. At last, the clear water turns into drinking water on the role disinfectant from the disinfectant-dosing equipment 19.

Figure 2:
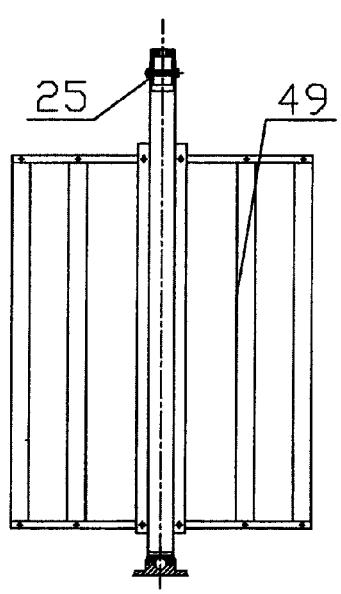
FIG. 2: shows the conventional flat-plate impeller.

In FIG. 2, the conventional fiat-plate impeller mainly works rotatively by the flat agitator blade 49 in driving of the frequency-changing motor 25.

Figure 3:
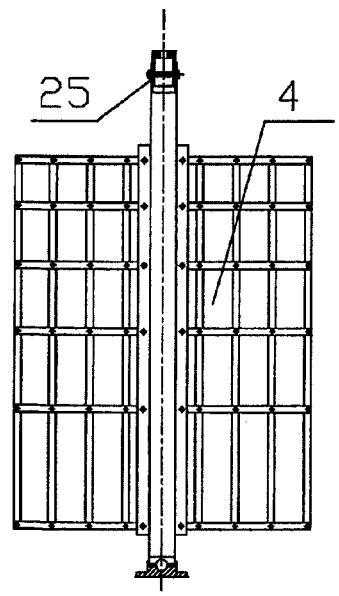
FIG. 3: shows the variable grid impeller of the invention.

In FIG. 3, the variable grid impeller 4 of the invention changing into variable grid of flat-plate, works rotatively by driving of the frequency-changing motor 25.

Figure 4:
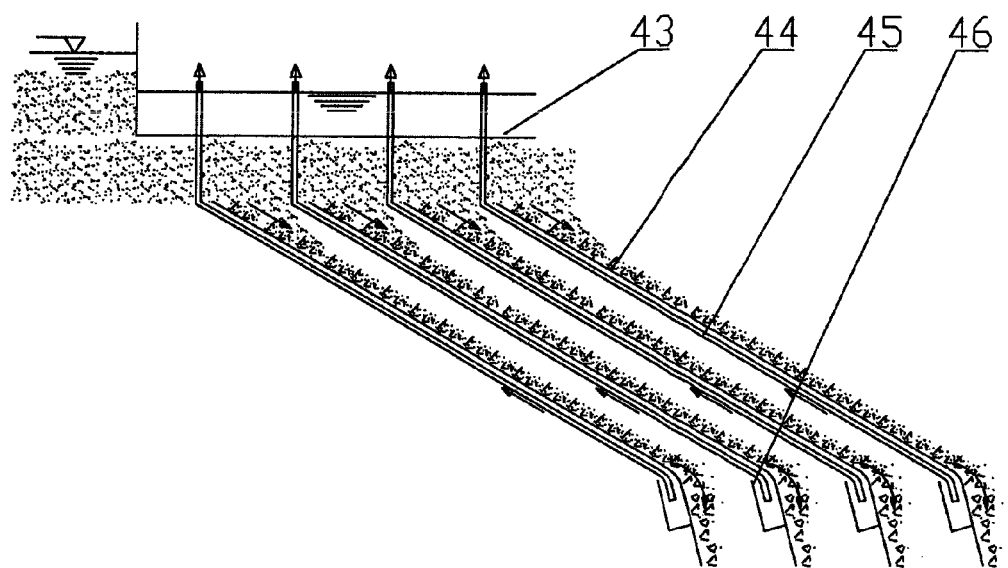
FIG. 4: shows the process diagram of the conventional same flow oblique board sedimentation.

As shown in FIG. 4, in the process diagram of the conventional same-flow oblique board sedimentation. After entering into the influent distribution zone 43, water flushes into the top from the bottom of the oblique boards 44, and at the same time the sludge slides down.

Figure 5:
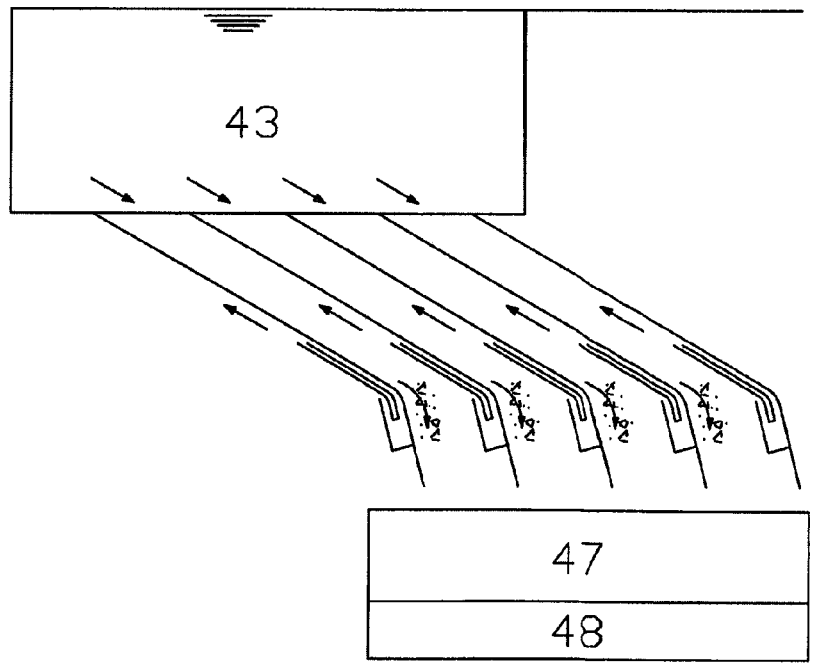
FIG. 5: shows the conventional same-direction influent mode enlarging the depth of the tank

In FIG. 5, the conventional same-direction influent mode deepens the depth of the sedimentation tank owing to having an influent distribution zone 43 above the sedimentation tank.

Figure 6:
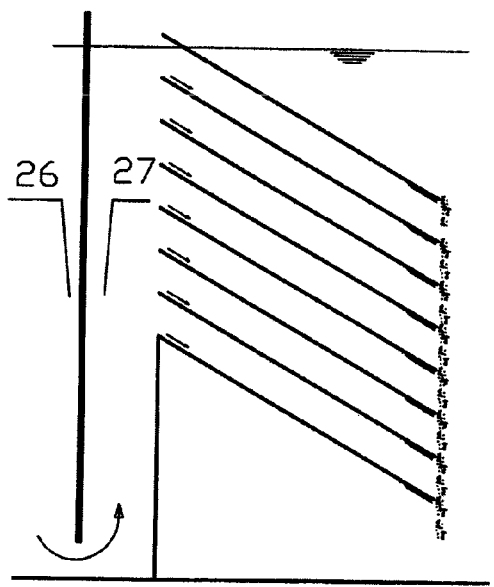
FIG. 6: shows the vertical stack-up oblique boards of the invention.

In FIG. 6, the same-flow oblique boards 8 of this invention device with vertical stack-up board, facilitated water to flow into the distribution area for well water 27 together with the sludge in the same direction.

Figure 7:
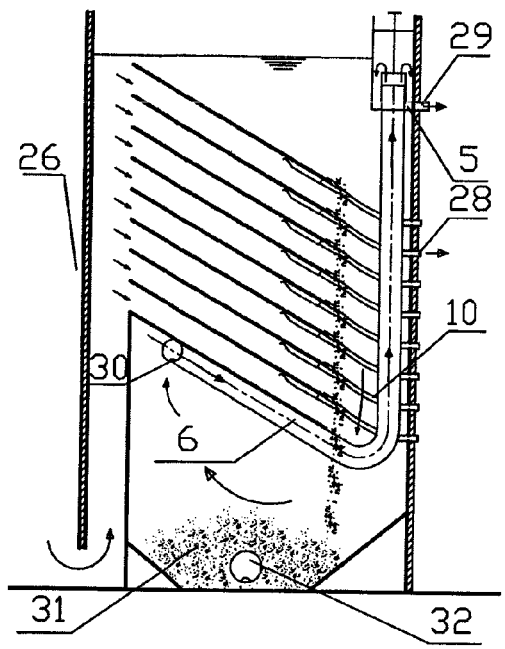
FIG. 7: shows the forced water-outlet pipe of the invention regulating the effluent flow.

In FIG. 7, it is the forced water-outlet pipe regulating the effluent flow. Water from the reaction tank 26 is collected by the forced water-collecting pipe 6 via water inlet 30 at the bottom of oblique boards, and then flows into the forced water outlet 29. By regulating the water level from the sedimentation tank to the filter tank and setting up a flume under the oblique boards, the upper purifying water flows into the filter tank via the outlet tube 10. Then, the sludge staying in the oblique boards slides down into the mud bucket 5, and is discharged by the mud-discharging pipe 32.

Figure 8:
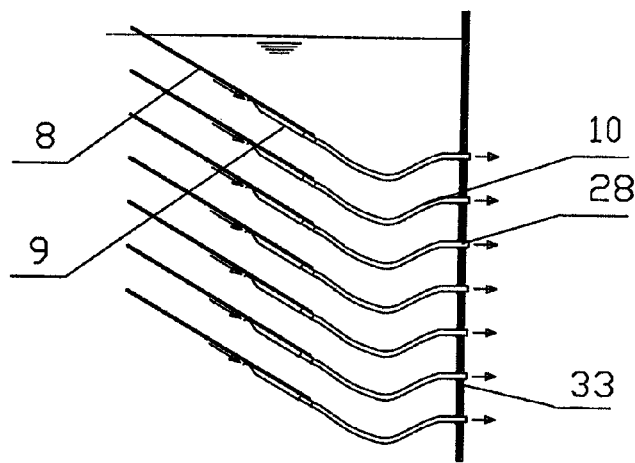
FIG. 8: shows the short-pipe water-collection system of the invention.

In FIG. 8, it is the short-pipe water-collection system of this invention device. After passing the same-flow oblique boards 8, the clear water is collected by these dimentation water collector 9 by the purified water outlet tube 10, and then enters into the division plate 33 of the other side of the filter tank via the clear water outlet 28.

Figure 9:
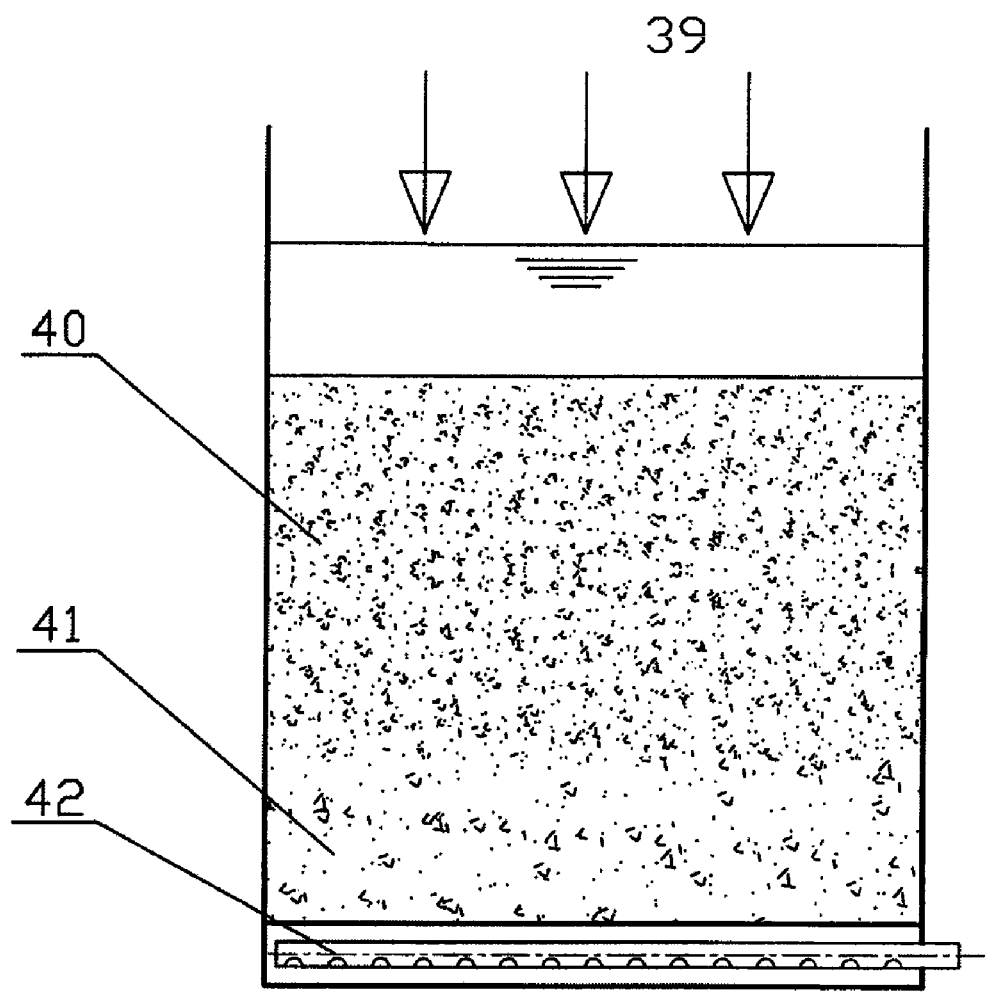
FIG. 9: shows the filter area of conventional filter tank.

In FIG. 9, it is the filter area of the conventional filter tank. In the direction of filtration 39, water flows through the sand filter layer 40 and the cobble support layer 41, and then flow out of the effluent pipe 42. The effective area of the filter cloth is the surface area of the filter tank.

Figure 10:
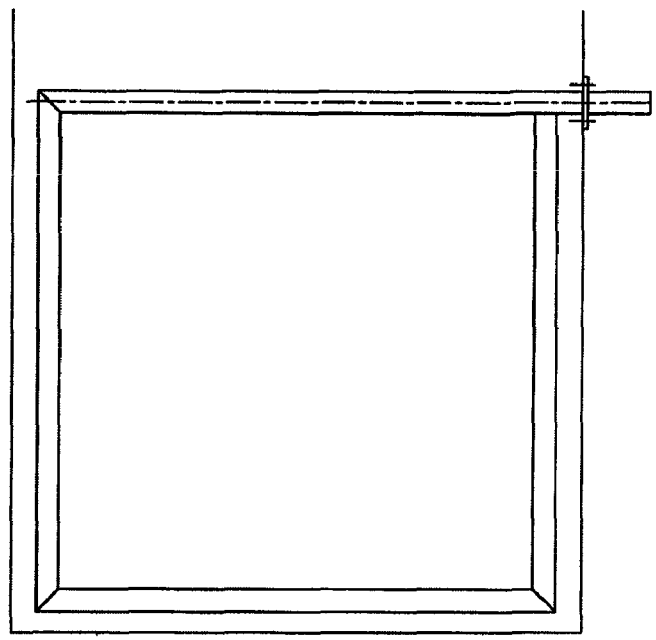
FIG. 10 shows the filter area of the device enlarges at least eight times, wherein (a) is the area of conventional monolithic filter area, (b) is the filter area of the invention.
Figure 10:
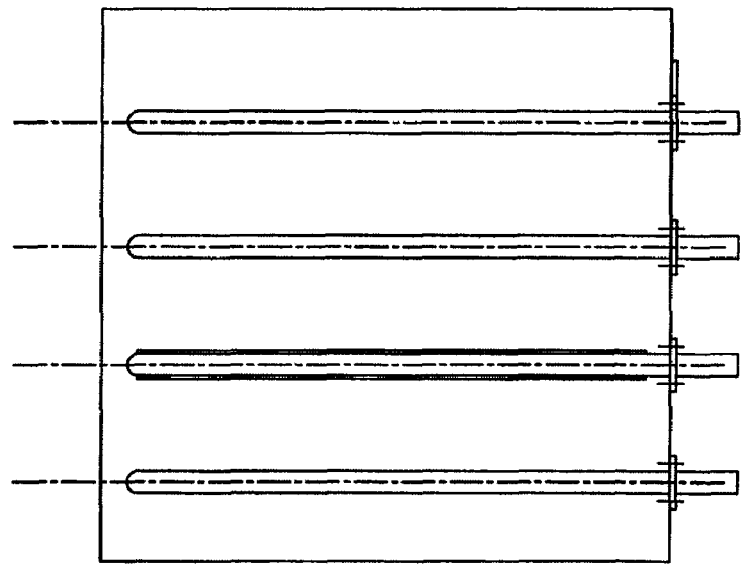

In FIG. 10, it is the filter area of this invention device, and the filter cloth is used as filter material. In FIG. 10($a$), it is the area of monolithic filter cloth. In FIG. 10($b$), four pieces of monolithic filter cloth are fixed in the filter tank. Because both sides of the every monolithic filter cloth works together when filtering, the effective filter area enlarges at least more than eight times.

Figure 11:
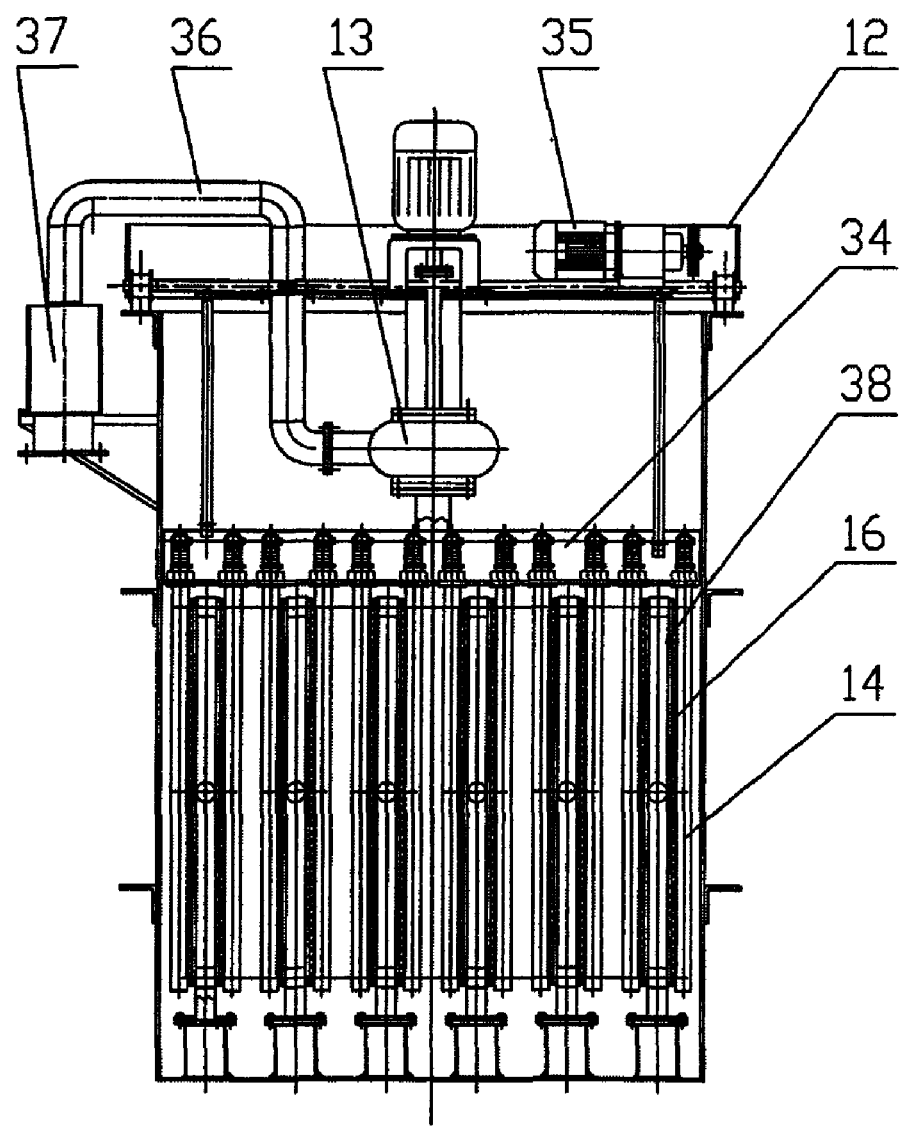
FIG. 11 shows the mud-suction backwash system of the invention.

In FIG. 11, it is the mud-suction backwash system of this invention device. Driven by the driving motor 35, the traveling mud-suction machine 12 moves forth and back along the filter frame 38, and at the same time the sludge in the blanket-like wedge filters 16 is removed by the mud-suction pipe 14 closing to the both sides of the blanket-like wedge filters 16. The removed sludge is sucked by the mud-suction pump 13 into mud-discharge pipe 37, and at last is discharged through the mud-suction main pipe 34.

The process of this invention device is as following:

Raw water is elevated by the inlet pump 1 through the intake of the river. The coagulant is injected in the inlet pump 1, strongly agitated by the water pump impeller, and the mixed stage does not complete until the water flow entering into reaction tank 3. Under the action of the variable grid impeller 4, the water flow is reacted completely from top to bottom, so floc colloid could be formed in the process of crash. After water flow into the sedimentation tank 7, the water and sludge are separated into the filtration tank 11. Clear water is collected by the sedimentation water collector 9, and gathered in the purified water outlet tube 10, and spilled in the filtration tank 11. Sludge is glided into the mud bucket 5 by the same-flow oblique boards, at in the mud bucket 5 where water and sludge are separated further. Separating water in the sludge hopper flow into the filtration tank 11 through the forced water-collecting pipe 6. Sludge in the mud bucket 5 is compelled and gathered and discharged regularly.

Because of the resistance of the effluent weir 15, water level in the filtration tank 11 is gradually elevated to the blanket-like wedge filters 16. Water filter through the filtered plates from inner to outer, and the unremoved little floc is retained and adsorbed in the filter layer. After collecting by the water-collecting main pipe 17, clear water spill out of effluent weir 15 and flow into the clear water basin with the addition of disinfectant through the purified water outlet 18. With the filter process, the retention of pollutant increase, so the resistance of filtration increase, either, which elevate the water level in the filtration tank 11. Filter material need to be flushed after the water level reach the set height. This moment, the sludge-adsorbing pump 13 start to operate and the traveling mud-suction machine 12 begin to run to drive the mud-suction pipe 14 which adhered on the filter plates moving slowly. Back flushing water go through the filter plates from inner to outer, taken by the sludge-adsorbing pump 13 together with the sludge adsorbed on the plates.

When the traveling mud-suction machine 12 move a single journey or round trip along the filter plate, the linear sweeping and washing task of all filter plates is completed. The sludge-adsorbing pump 13 and the traveling mud-suction machine 12 stop subsequently. The water and sludge are discharged from the sludge channel through the mud-suction main pipe 34. During the overall process, the back flush water is from the filtered clear water, without the supplement of other water source. At the same time, the raw influent and clear water need not suspend, but the amount of the effluent decreased.

The invention claimed is:

1. A modular integrated water-purifying device, comprising:
    a reaction tank;
    a sedimentation tank;
    a filtration tank, wherein said reaction tank, said sedimentation tank and said filtration tank are linked in sequence;
    an inlet pump having one end that is connected to an upper side of said reaction tank through a pipe and a valve;
    coagulant-dosing equipment connected to the other end of the inlet pump via a water-suction tube;
    a purified water outlet connected to the filter tank; wherein
    the reaction tank includes a variable grid impeller;
    the sedimentation tank includes
        a water collector,
        a forced water-collecting pipe,
        a plurality of same-flow oblique boards sat in the middle of the sedimentation tank and connected via the forced water-collecting pipe to the water collector, and
        an purified water outlet tube for discharging purified water and one end of the purified water outlet tube being connected to the sedimentation water collector,
    the filtration tank includes
        a traveling mud-suction machine movable back and forth at a top of the filtration tank,
        a wedge filter vertically fixed inside the filter tank,
        a mud-suction pipe,
        a mud-suction pump fixed in a bottom of the traveling mud-suction machine and connected with the wedge filter by the mud-suction pipe,
        a water-collecting main pipe at a bottom of the filter tank, and
        an effluent weir vertically fixed within the filter tank,
    the forced water-collecting pipe is connected with a forced water outlet by a forced water outlet pipe, and
    the forced water outlet is arranged at the top of the sedimentation tank.

2. A modular integrated water-purifying device according to claim 1, wherein the other end of the purified water outlet tube is inserted in a hole of a division plate of the sedimentation tank.

3. A modular integrated water-purifying device according to claim 1, further comprising a disinfectant-dosing equipment connected with the purified water outlet.

4. A modular integrated water-purifying device according to claim 1, further comprising a clean water tank connected the purified water outlet.

5. A modular integrated water-purifying device according to claim 1, further comprising a frequency-changing motor connected to said variable grid impeller.

6. A modular integrated water-purifying device according to claim 1, wherein
    said filtration tank comprises a filter frame in which the wedge filter is plugged, a mud-discharge pipe, and a mud-suction main pipe,
    the traveling mud-suction machine is connected to a driving motor, and
    the mud-suction pump is connected by the mud-suction main pipe to the mud-suction pipe.

\* \* \* \* \*